June 22, 1971 R. D. OGG 3,585,728

COMPASS CARD WITH MAGNETIC PARTICLES

Filed June 2, 1969 2 Sheets-Sheet 1

INVENTOR.
ROBERT D. OGG
BY Granoff and Hoppe
ATTORNEYS

June 22, 1971 R. D. OGG 3,585,728

COMPASS CARD WITH MAGNETIC PARTICLES

Filed June 2, 1969 2 Sheets-Sheet 2

INVENTOR.
ROBERT D. OGG
BY
Eckhoff & Hoppe
ATTORNEYS 3,585,728
COMPASS CARD WITH MAGNETIC PARTICLES
Robert D. Ogg, Portland, Maine, assignor to
The Eastern Company
Filed June 2, 1969, Ser. No. 829,534
Int. Cl. G01c *17/04*
U.S. Cl. 33—222 1 Claim

ABSTRACT OF THE DISCLOSURE

An improved compass card wherein the magnetic portion of the card is provided in the form of small magnetic particles either in the body of the card as such or as a layer applied over at least one face of the card. The magnetic particles have a magnetization of substantially the same intensity while their direction of magnetization is at an angle of substantially 20° to the axis of revolution of the card. A card so constructed is free of the gyrational motion which characterizes cards used heretofore and wherein separate magnets were supported upon the card.

SUMMARY OF THE INVENTION

Compass cards heretofore have been made of a non-magnetic material, usually aluminum. One or more bar magnets are secured, usually to the underside of the card, to provide the necessary pole-seeking property of the card. Because the mass of the bar magnets is not in the plane of the card, the card is subject to substantial gyrational motion. For example, if the boat or airplane carrying the compass would suddenly change direction, the card would tend to tilt as it swung to a new position with respect to its mounting. But, because the mass of the magnets is off-center with respect to the plane of the pivot point, the card would continue to swing past the horizontal plane. The card would then have a swing back and would take several oscillations before the card would come to rest. The card of the present invention is free of these difficulties.

Further, if the magnets are not in the plane of the card, they extend downward like paddles into the damping liquid and exert a drag on the card as the vessel or plane turns. The card of the present invention includes magnetic means which increase the thickness of the card little, if any, and do not provide any protrusions from the smooth surface of the card so that the damping liquid can flow over the surface of the card and cause minimum drag. Further, being magnetized at an angle of substantially 20° to the axis of revolution of the card or 70° to the plane of the card, the card is subject to a minimum of turning lag upon a sudden shift in position of the body of the compass.

DESCRIPTION OF THE PREFERRED EMBODIMENT

Figure 1:
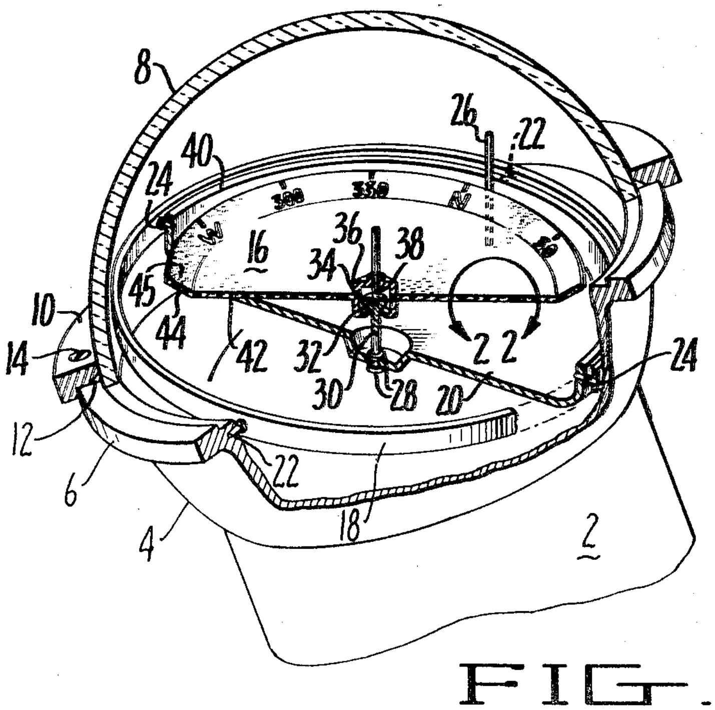
FIG. 1 is a perspective view of a compass embodying the present invention.

Referring now to FIG. 1, an embodiment of the invention is shown in the general form of a damped spherical compass of the type described in British Pat. No. 1,095,966 of Dec. 20, 1967 and entitled Magnetic Compass. The instrument shown is mounted on or supported by a cup-shaped base 2 of brass, aluminum or other non-magnetic material, for mounting in a binnacle or other conventional support. A hemispherical shell or bowl 4 of non-magnetic material, which may be made, for example, of brass is secured on base 2. The open edge of the bowl forms a circumferential flange 6 in which is received the lower edge of a transparent hemispherical dome 8 of glass or plastic. Both the bowl 4 and the dome 8 are formed as nearly as practicable to a true spherical form, as any material departure from this form impairs the ability of the composite spherical container to roll with respect to the body of damping liquid with which it is filled. A retaining ring 10 fits over the flange 6 and is beveled to receive a compressible annular gasket 12 for sealing the spherical container. The ring 10 is held in place by a series of screws 14 which serve to clamp the dome in a fluid-tight seal against the bowl.

A compass card 16 is supported horizontally within the container by gimbal means which include an outer gimbal ring 18 and a generally saucer-shaped inner gimbal member 20. The outer gimbal ring 18 is supported by a pair of trunnions 22 spaced at 180° on the bisecting plane or equator of the container provided by the hemispherical bowl 4 and the hemispherical dome 8. These trunnions define a first roll axis. The gimbal ring 18 carries a second pair of trunnions or pivot pins 24 spaced at 90° intervals to the trunnions 22 for supporting gimbal member 20 and these define a second axis. Thus the compass proper demains horizontal. The member 20 and the surrounding gimbal ring 18 occupy substantially all of the equatorial plane within the sphere so that the maximum damping action is applied by the inertia of the contained liquid. Since the gimbal means are supported concentrically within the sphere, the container may be tilted at any angle without producing interference. An upright pin 26 is mounted in the gimbal member 20 to serve as a lubber line for reading the compass heading.

Secured to the center of member 20 by a pair of clamping nuts 28 is a vertical post 30, which may carry (if desired) a depending balancing weight (not shown), and which projects upwardly to form a cup 32 for receiving a jewel pivot bearing 34. The compass card 16 is provided with a central housing 36 which is received freely over the cup 32, and a cone-point pivot 38 is mounted in this housing by conventional means for seating in the pivot bearing 34. The compass card 16 is thus mounted for rotation on a vertical axis defined by the pin 38, and lies approximately in the plane of the gimbal member 20.

Figure 2:
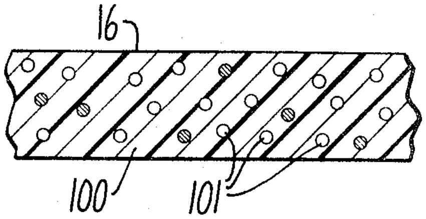
FIG. 2 is an enlarged section taken along the line 2—2 in FIG. 1.
Figure 3:
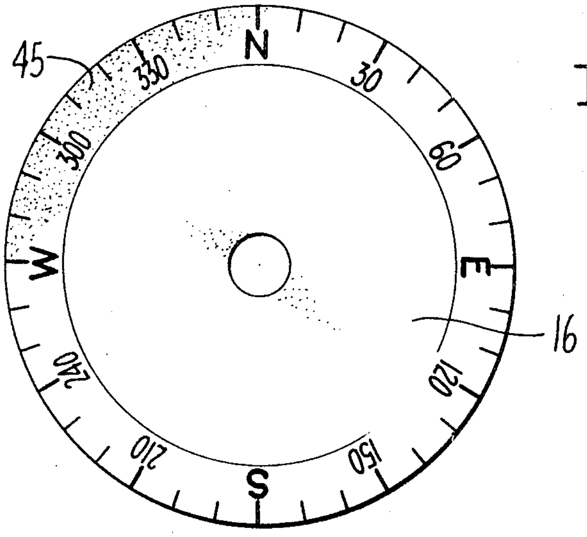
FIG. 3 is a plan view of the compass card of FIG. 1.
Figure 4:
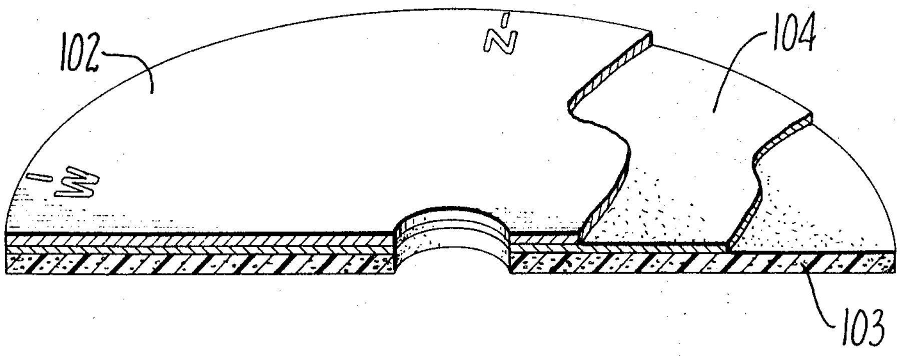
FIG. 4 is a section through another embodiment of the compass card of the present invention.

In the embodiment shown in FIGS. 1–3, card 16 comprises a saucer-shaped member of thin sheet material having a substantially flat base portion 42 and a tilted or upturned rim 44, although the card can be flat as is shown in FIG. 4. It will be noted that the bearing indicia of the compass card 16 are mounted on the inside (or upper, as drawn) surface 45 of the rim 44. The means of marking the indicia is not critical, and, as examples, the indicia can be embossed on the rim or marked thereon in any conventional manner. It is important, of course, that any form of marking that is used should be compatible with the damping fluid in the shell 4 and should be of good contrast, such as white letters and numerals on black background, or the reverse.

In accordance with this invention, to give the compass card pole-seeking characteristics, instead of attaching a pair of magnets to the underside of the compass card 16, as is shown in FIG. 4 of the aforementioned British patent, the card itself includes magnetic particles such as to give the card pole-seeking characteristics. Thus as is shown particularly in FIG. 2, the card is made of a rigid plastic material 100 having suitable magnetic particles 101 dispersed therein. As magnetic particles, one can use any one of the well-known materials within this broad designation, such as iron, cobalt, various known magnetic alloys such as alnico, magnetite, gamma ferric oxide, ferrites or other ceramic magnetic materials, such as barium titanate. Preferably the particles have an acicular shape. Any organic plastic material can be used so long as it has sufficient mechanical strength and is inert to the damping fluid.

The card is manufactured with the magnetic particles in an unmagnetized condition. After fabrication, the card is subject to a magnetic field such that, in relation to the symbol or indicium on the card designating "North," the direction of magnetization of the particles is substantially uniform and at substantially 20° to the axis of revolution of the card or 70° to the plane of the card. This direction applies in the Northern hemisphere. In the Southern hemisphere, one should effect the magnetization with relation to the "South" designation.

Another form of compass card is shown in FIG. 4 where the card proper is designated as 102 and a layer 103 of a material containing particles of a magnetic material is secured over a face of the card 102 by a layer of adhesive 104. In this embodiment of the invention, the card 102 can be of conventional material, e.g. brass, and the plastic matrix holding the magnetic particles need not be rigid but could be of synthetic rubber or like material.

Figure 5:
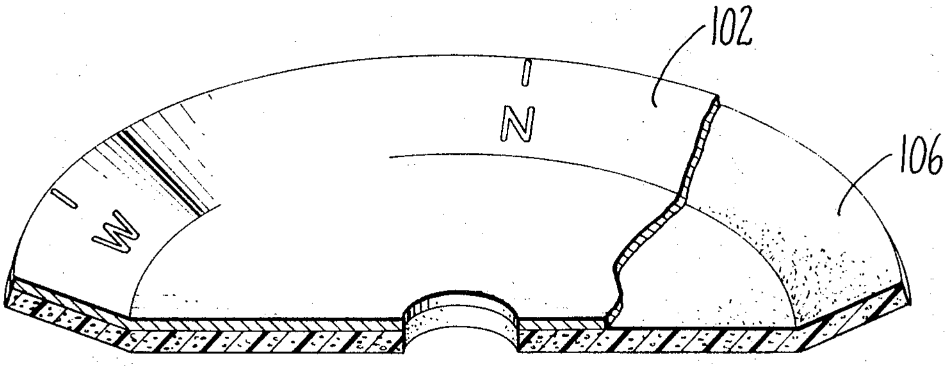
FIG. 5 is a section through still another embodiment of the present invention.

In the form of card shown in FIG. 5, the layer of material, including a binder and magnetic particles, is shown at 106. The layer 106 is applied directly to the card 102 as a thick fluid and is then dried or otherwise set directly upon the card. The particles may be orientated while the plastic is still fluid as is well-known to those skilled in the art.

In each of the cards shown in FIGS. 4 and 5, the same magnetization is effected as with the card of FIGS. 1, 2 and 3.

From the foregoing, I believe it is apparent that a cardanically mounted compass card is provided wherein the pole-seeking characteristics of the card are provided in such fashion that the card is free from any reaction to forces which would move the card gyrationally.

I claim:

1. A compass having an annular compass card wherein at least a portion of the card is composed of a solid binder having particles of magnetic material distributed therethrough, said particles having a magnetization of substantially the same intensity and of the same direction, said direction being at an angle of about 20° to the axis of revolution of said card and in substantial alignment with that indicium on the card indicating the magnetic north.

References Cited

UNITED STATES PATENTS 2,770,890 11/1956 Bellon et al.

FOREIGN PATENTS 303,482 2/1918 Germany.
584,734 9/1933 Germany.
2,309 5/1875 Great Britain.
113,741 3/1918 Great Britain.

ROBERT B. HULL, Primary Examiner